3,106,550
HIGH SOFTENING POINT MALEIC MODIFIED TALL OIL ROSIN GLYCEROL ESTERS
Russell D. Bitting, Naperville, Ill., and David A. Berry, Columbus, Ohio, assignors, by mesne assignments, to Union Bag-Camp Paper Corporation, New York, N.Y., a corporation of Virginia
No Drawing. Filed Aug. 27, 1959, Ser. No. 836,345
5 Claims. (Cl. 260—97.5)

This invention relates to polyhydric alcohol esters of maleic acid reacted in limited proportions with rosin by Diels-Alder reaction to form adducts in the form of rosin esters and more particularly, the invention relates to preparation of maleic dienophile adducts with rosin selected from the group consisting of tall oil rosin, wood rosin and gum rosin, the maleic esters of the polyhydric alcohol being prepared in a molar proportion of about 1.5–2.6 mols of polyhydric alcohol per mol of maleic anhydride or maleic acid and thereafter reacting the so-formed ester with said rosin.

The polyhydric alcohol for preparing the maleic ester contains at least three hydroxyl groups with two of said hydroxyl groups being terminal primary hydroxyl groups, for example, glycerol and pentaerythritol, which are preferred. The polyhydric alcohol ester is reacted with the rosin in an amount from about 3 parts to about 15 parts of maleic content of ester per 100 parts of rosin in the presence of about 0.5–2 milliliters of mineral acid catalyst per 1000 grams of rosin ester mixture, e.g., phosphoric acid of sulfuric acid at a temperature of about 425–550° F., preferably 450–525° F. for a time sufficient to form the rosin adduct having an acid number less than 20, preferably 15 to 20.

These maleic modified rosin esters are characterized by their high softening point which is higher than that obtained with the same rosin and maleic anhydride prepared in the conventional manner by first forming the adduct by Diels-Alder reaction with rosin and thereafter esterifying with the same alcohol in the presence of an acid.

Rosin adducts with maleic anhydride, maleic acid and maleic esters are known. Also the methods of preparation of esters of these adducts are well known. See patent to Koonce et al. No. 2,538,103 and Krzikalla et al. No. 2,039,243 for tall oil maleic-rosin esters.

Rosin or colophony is available from natural sources. Such rosins are generally identified with appropriate reference to the natural sources, such as wood rosin, gum rosin, and tall oil rosin and are composed mainly of abietic acid and other abietic type rosin acids, levopimaric acid, neoabietic acid and palustric acid.

Recent work at the Naval Stores Research Station, Olustee, Florida, "D. E. Baldwin, V. M. Loeblich, and R. V. Lawrence, The Acidic Composition of Oleoresins and Rosins, April 1957, Division of Paint, Plastics, and Printing Ink Chemistry Preprint Booklet," has indicated that the abietic and neoabietic acid content is the major difference in composition of wood and gum rosin. This work has shown that gum rosin contains approximately 20 percent abietic and 18 percent neoabietic acids, whereas wood rosins contains approximately 41 percent abietic and only 9 percent neoabietic acids. The composition of tall oil rosin is similar to wood rosin in respect to distribution of rosin acids. Other major differences between the tall oil rosin used in this work (Union Bag-Camp Paper Corporation's Unitol ROS) and gum or wood rosin, are the unsaponifiable and fatty acid contents. The tall oil rosins contained 2 to 3 percent unsaponifiable materials and a similar amount of fatty acids, whereas gum and wood rosin contained about 10 percent unsaponifiables and essentially no fatty acids.

Maleic anhydride, maleic acid or fumaric acid will react with rosin acids to form an acid having three carboxyl groups. Esters of these addition products are used extensively in varnishes, lacquers and inks. Upon heating, the abietic-type rosin acids isomerize to levopimaric acid, which will then add to the maleic anhydride by a typical Diels-Alder reaction. Maleic anhydride is reacted with rosin to increase the hardness, softening point, and viscosity of the resulting esters. Where resins of extremely high softening points (an indication of hardness) are required, both tall oil and wood rosin maleic-modified esters have fallen short of comparable gum rosin esters.

Conventional methods, when applied to tall oil and wood rosins, have not been capable of providing rosin esters with softening points as high as, or equivalent to, those of gum rosins with comparable maleic modifications. Where extremely high softening point resins are desired, gum rosin esters have been used. While it has been recognized that pre-esterification of the maleic before adding the rosin, rather than by the more commonly used method of forming the rosin-maleic adduct before esterification, might provide a slight increase in softening point of maleic-modified tall oil rosin esters, the increase is not significantly different than the increase obtained with gum rosin esters made in this manner.

It has been discovered that maleic-modified tall oil rosin esters may be prepared by the method of the invention with softening points higher than heretofore obtainable. The high softening point maleic-modified tall oil rosin glyceryl esters thus obtained provide softening points as high as, or higher than, may be obtained with gum or wood rosin esters prepared by any known method.

Conventional methods of preparation of maleic-rosin adduct esters rely for hardening effect of the product upon reaction with maleic anhydride or maleic acid. After first forming the maleic adduct of the rosin utilizing maleic anhydride or acid proportions to achieve maximum rise in softening point, thereafter the esterification with polyhydric alcohol is carried out for the purpose of achieving improved viscosity, higher softening point and higher molecular weight for purposes of use in varnishes, lacquers and molding masses. See Krzikalla et al. 2,039,243, page 2, column 1, who shows the purpose of achieving better performance in use as a rosin size for sized paper. Also see Dreschsel et al. Patent No. 2,791,578 for use of rosin-maleic adduct ester rosin size.

The prior art recognizes that it is important to provide as high a softening point as can be attained by adduct formation. Since maximum softening point is directly related to the maximum hardness attained in the esterified final product, the highest softening product of gum rosin has been preferred commercially for maximum hardness and the desired compatibility for end use in coatings, printing inks and molding masses.

Although up to 1 mol of maleic anhydride or equivalent (see Krzikalla Patent No. 2,039,243) will form Diels-Alder adduct with tall oil rosin, wood rosin and gum rosin, much smaller amounts of maleic dienophile are used in accordance with the invention for the reason that surprising increases in softening point are observed with as little as 7% maleic in the ester-modified rosin. Since increase in hardness and improvement in compatibility are the objectives, it is preferable to use lesser amounts of the more expensive maleic anhydride ingredient than 1 mol per mole of rosin consistent with achieving the hardness and compatibility properties desired in the product.

The upper limit of maleic anhydride proportions of 15 parts maleic anhydride converted to the ester per 100 parts of rosin is based upon the maximum amount which can be used without causing gelling of the product. With more than 15 parts of maleic anhydride converted to the ester per 100 parts of rosin, tall oil rosin and gum rosin ester products gel to form compositions which are not compatible with other synthetic resins and are therefore undesirable.

In the preferred range of maleic diester modified rosin products of the invention, the softening points (ball and ring method) vary from 271–275° F. for wood rosin products, from 287–294° F. for gum rosin product and from 290–305° F. for tall oil rosin product, these products cooked to an acid number of 15 to 20 and using 15% excess glycerol for esterifying polyhydric alcohol for maleic anhydride.

There are a number of factors involved in the greater rise in softening point of tall oil rosin esters as compared to gum rosin ester and wood rosin esters when the maleic dienophile reactant is preesterified and the rosin reacted in the presence of phosphoric acid catalyst as the preferred adduct forming catalyst. Phosphoric acid is the preferred catalyst in an amount of at least 0.5 milliliter and up to about 2.0 milliliters per 1000 grams of ester as 85% phosphoric acid.

Firstly, there would appear to be little reason for using phosphoric acid as catalyst in preparing glyceryl esters of the rosins such as wood rosins, tall oil rosins or gum rosins since these unmodified rosin esters do not have appreciably different softening points when prepared with this phosphoric acid catalyst in the same concentration range than when prepared in the absence of the catalyst under the same temperature conditions for producing the ester. Also, if 2.0 milliliters of phosphoric acid are added to 1000 grams of unmodified tall oil rosin ester, the product becomes soft at room temperature and is hence wholly unsuitable for purposes of achieving film hardness. Accordingly, a lowering rather than raising of softening point would be expected.

Secondly, although the isomerization of rosin acids is known to be enhanced by acid to thereby permit greater reactivity with maleic dienophile on Diels-Alder reaction, the expectation would be that maleic modified wood rosin esters and maleic modified tall oil rosin esters would have higher softening points than gum rosin due to its higher abietic acid content, regardless of the methods for preparing these esters. Wood rosin and tall oil rosin contain about twice the amount of higher softening point abietic acid than does gum rosin and in view of the much higher melting point of abietic acid, it is surprising that gum rosin products made by the method of the invention have an appreciably higher melting point than the wood rosin product.

The maleic anhydride is preferably reacted with all the polyol, that is, an amount equivalent to the maleic and the rosin plus 15% excess. Actual proportions for a resin containing 11.0 parts maleic per 100 parts of rosin are:

|  | Grams | Mols | Equivalents |
| --- | --- | --- | --- |
| Rosin | 100 | 0.33 | 0.33 |
| Maleic | 11 | 0.11 | 0.22 |
| Glycerol | 19.5 | 0.21 | 0.63 |

Thus, the molar proportion of glycerol:maleic is about 2:1. For a resin containing 7 parts of maleic anhydride per 100 parts of rosin, the molar proportion is about 2.5:1. For a resin containing 15 parts of maleic anhydride per 100 parts of rosin, which is above the level at which final resin can be made without gelation, the molar proportion is about 1.6:1.

Glycerol esters are preferably made with over 7 parts maleic anhydride per 100 parts rosin but pentaerythritol esters are made with as little as 2–4 parts maleic per 100 parts of rosin up to about 10 parts maleic per 100 parts of rosin.

The upper limit of maleic modifier per 100 parts of rosin which is formed is adjusted to a value below about 15 parts of maleic per 100 parts vinyl rosin in order that gelation of the ester and rosin be prevented. In a preferred range of glycerol ester modification using maleic anhydride, the proportion of maleic in the final product is held within narrow limits of about 8 parts to about 13 parts of maleic or equivalent to 100 parts of rosin. For the corresponding pentaerythritol esters the proportion of maleic which is used is preferably about 3 parts to 8 parts of maleic or equivalent to 100 parts of rosin.

In addition to glycerol or pentaerythritol, the polyhydric alcohol used may be one of dipentaerythritol, trimethylol propane, tetramethylol ethane, trimethylol butane, etc., or mixtures of these.

To illustrate the unexpected increase in softening point by the process of the invention, a comparison is set forth for gum rosin, wood rosin and tall oil rosin which are maleated and esterified by conventional procedures and which are maleated and esterified by the method of the invention. Glycerol is used as the polyhydric alcohol. The results are shown in Table I below.

In order that the procedures be comparable in all respects, there is used in the illustrated methods in Table I for each type of rosin product, the same proportions of 11 parts of maleic dienophile to 100 parts of rosin. All of the rosin ester products were carried to the same end point in the last step of reaction, e.g., to an acid number of 15–20 at the end. The polyhydric alcohol used for esterification was 95% U.S.P. glycerol, used in 15% excess. Thus the changing proportions were 11 parts of maleic anhydride, 100 parts of rosin and 19.5 parts of glycerol.

The conventional procedures for (1) modifying rosin with maleic anhydride and (2) esterifying with glycerol was carried out for two cases, e.g., by procedure (a) esterifictaion in absence of catalyst and (b) esterification in the presence of catalyst.

Under both of these procedures (a) and (b) the proportions of maleic anhydride and rosin were charged to the kettle, the temperature raised to about 295°–320° F. for about 2 hours, the glycerol charged and the mixture heated to 475°–530° F. for a period of time until the acid number drops to 15–20.

The catalyst used is 0.5 milliliter of 85% (syrupy) phosphoric acid per 1000 grams of ester.

TABLE I

*Properties of Maleic-Modified Rosin Glycerol Esters* [1]

[Modified with 11 parts maleic per 100 parts of rosin]

| Rosin (Type) [2] | Ball and Ring Softening Point (F.) | Color | Hours at 520° F. |
|---|---|---|---|
| *(Maleic Pre-esterification-Rosin Adduct Esterification With Phosphoric Acid)* | | | |
| Tall oil | 290 | WG-WW | 1 to 2 |
| Gum | 287 | WG | 1 to 2 |
| Wood | 271 | WG-WW | 1 to 2 |
| *(Maleic Pre-esterification-Rosin Adduct Esterification Without Acid Treat)* | | | |
| Tall Oil | 263 | WG-WW | 2 to 3 |
| Gum | 271 | N-WG | 2 to 3 |
| Wood | 264 | WG-WW | 3 to 4 |
| *(Rosin-Maleic Adduct Esterification With Phosphoric Acid)* | | | |
| Tall Oil | 268 | K-M | 12 to 13 |
| Gum | 276 | WG | 8 to 9 |
| Wood | 252 | WG | 8 to 9 |
| *(Rosin-Maleic Adduct Esterification Without Acid Treat)* | | | |
| Tall Oil | 254° F. (123° C.) | M-WG | 5 to 7 |
| Gum | 268° F. (131° C.) | M | 9 to 10 |
| Wood | 246° F. (119° C.) | WG-WW | 7 to 8 |

[1] Resins were esterified to an acid number of 15 to 20.
[2] Rosin grades were as follows:
  1. Lighter than X grade tall oil rosin.
  2. WW Grade gum rosin.
  3. WW Grade wood rosin.

The foregoing table shows that the softening point of maleic modified tall oil, gum, and wood resin esters are each raised to maximum values by pre-esterifying the maleic before forming the rosin adduct, and completing the esterification in the presence of an inorganic acid (i.e., phosphoric), rather than (1) pre-esterifying without the presence of an acid or (2) esterifying the preformed rosin-maleic adduct with or without the presence of an acid.

The greatest rise in the softening point of any of the rosins investigated was obtained with tall oil resin when cooked by pre-esterifying the maleic and forming the rosin adduct in the presence of phosphoric acid. The cooking procedure is also given in Example I.

The maleic-modified tall oil rosin esters cooked by this procedure usually have softening points as high, or higher, than similar gum rosin esters. This is significant, since gum rosin has generally been considered a requirement for maximum softening point in maleic-modified resins.

As indicated by the data in Table I one other unexpected benefit of the procedure of the invention is the drastic reduction in time required to complete reaction. As shown in Table I there is a reduction from the 5 to 10 hours in the standard procedure to 1 to 2 hours in the application procedure. Since the use of acid in the standard procedure has little effect on the processing time, while the use of acid in the pre-esterification procedure reduces the time by approximately 40%, it is unexpected that the mineral acid should have this effect.

The increase in softening point of ester products for each rosin type made by the various processes under controlled conditions as illustrated in the above table is significant to point out the differentiation of these products due to their method of manufacture and due to the selection of the rosin type.

Taking the conventional process of rosin-maleic adduct formation followed by glycerol esterification in the absence of catalyst as a reference standard process which yields lowest softening points, the following are the lowest softening for the rosin types and order of softening point:

*Rosin-Maleic Adduct Formation and Esterification*

| Order of Softening Point | Type | Lowest Softening Point By Conventional Method Absence of Catalyst, °F. |
|---|---|---|
| I | Gum Rosin | 268 |
| II | Tall Oil Rosin | 254 |
| III | Wood Rosin | 246 |

By carrying out the conventional process in the presence of acid catalyst, e.g., phosphoric acid, the following shows the increase in softening point due to use of catalyst in the conventional process:

*Rosin Adduct Esterified With Glycerol, Phosphoric Acid Catalyst*

| Order of Softening Point | Rosin Type | Increase in Melting Point, °F. | Order of Increase |
|---|---|---|---|
| I | Gum Rosin | +8 | 2 |
| II | Tall Oil Rosin | +14 | 1 |
| III | Wood Rosin | +6 | 3 |

By using the reverse procedure in the absence of catalyst, e.g., by first preparing glyceryl maleate and reacting with rosin in a Diels-Alder reaction the following represents the increase in softening points of the various rosin types compared with the standard thermal esterification (no catalyst) carried out by the conventional process:

*Adduct From Glyceryl Maleate and Rosin, No Catalyst*

| Order of Softening Point | Rosin Type | Increase in Melting Point, °F. | Order of Increase |
|---|---|---|---|
| I | Gum Rosin | +8 | 3 |
| II | Tall Oil Rosin | +9 | 2 |
| III | Wood Rosin | +18 | 1 |

By using the procedure of the invention, e.g., preparing glyceryl maleate and reacting with rosin in a Diels-Alder reaction in the presence of phosphoric acid catalyst in an amount of 0.5–2.0 milliliters per 1000 grams of ester, the following is the increase in softening point compared with the standard of thermal esterification by conventional procedure:

*Adduct From Glyceryl, Maleate and Rosin; Phosphoric Acid Catalyst*

| Order of Softening Point | Rosin Type | Increase in Melting Point, °F. | Order of Increase |
|---|---|---|---|
| II | Gum Rosin | +19 | 3 |
| I | Tall Oil Rosin | +36 | 1 |
| III | Wood Rosin | +25 | 2 |

Table I clearly demonstrates the achievement of a new product, the maleic modified tall oil ester product made by the process of the invention which displays a wholly unexpected high softening point illustrated at 11 parts maleic per 100 parts rosin modification for softening point of 290° F. If the product is modified with fumaric ester instead of maleic ester in accordance with the method of the invention, the softening point is lower, e.g., 280° F. which is higher than is produced with the same ingredients made by the conventional procedure of (1) adduct formation and (2) esterification. In this latter case, the fumaric acid modified tall oil rosin subsequently esterified with glycerol has a softening point which is not significantly lower, e.g., 275° F. The larger increase in softening point with the maleic modification and the advantages of lesser cost of maleic anhydride and lesser combining weight of maleic anhydride than of fumaric acid provides an important commercial advantage for the preferred species of maleic anhydride modification.

The difference in combining weight of maleic anhydride to fumaric acid is a difference between a combining weight of 49 to one of 58, in favor of maleic anhydride with lower combining weight. Since fumaric acid has been reported in some instances to give a somewhat higher softening point than maleic anhydride product, the reversal of this expectation for the preferred product species, the maleic species, is quite surprising. Higher softening point at lower cost of dienophile reactant and with lower combining weight being necessary present significant technical advantages.

It is unexpected that the critical amount of phosphoric acid or of sulfuric acid which may be used in place of phosphoric acid in amounts of about 0.8–2.0 milliliters per 1000 grams of rosin ester product should produce the observed increase in softening point by the method of the invention as illustrated in Table I.

In particular, it is noted that the softening point is increased by an amount of about 6° to 8° F. for gum rosin and wood rosin if the conventional thermal process of (1) adduct formation and (2) esterification is carried out in the presence of the acid in the same amount as in the process of the invention. The fact that an increase of 14° F. in softening point is noted for tall oil rosin when inorganic acid is used in the conventional process provides no practical benefit since the softening point of the modified tall oil ester product, 268° F., still falls far short of the standard commercial material, the gum rosin species which softens at 276° F. as shown in Table I.

By reversing the steps in accordance with the invention, e.g., first esterifying the dienophile then reacting to form the adduct and dropping the acid number below 20, the results are quite unfavorable for both modified tall oil rosin ester and modified gum rosin ester. The softening point drops vis-a-vis conventionally prepared ester in the presence of acid from a value of 268° F. for tall oil to 263° F. and from a value of 276° F. for gum rosin to a value of 271° F. The increase observed in softening point for this procedure without inorganic acid agent applied to wood rosin does not bring the softening point to a sufficiently high value as would lead one to select this wood rosin modification (softens 264° F.) as a replacement for conventionally prepared gum rosin products (softens 276° F.).

If acid were to bring about the expected 6 to 8° F. increase in softening point for the reverse procedure of (1) pre-esterifying and (2) adduct formation, the result would still place the product softening point of the gum rosin product at about 278° F.–280° F. and that of the tall oil rosin product at about 270° F.– 272° F. Surprisingly, the effect with the gum rosin product is demonstrated to be a rise to values which are 10° F. above those expected and with tall oil rosin about 20° F. above those expected. For the first time the value of softening point achieved with wood rosin by the method of the invention is directly comparable with the value of commercially preferred gum rosin, e.g., 271° F. as against 268° F. for gum rosin by thermal treatment, conventional method and 276° F. by acid treatment, conventional method.

It is therefore seen that the method of the invention not only carries the softening point of the rosin ester product to new high values for each of the three rosin species, but also brings wood rosin into consideration as a replacement for the commercial preferred species of gum rosin and provides as the highest melting species the tall oil rosin species.

The maximum amount of inorganic acid which is used in accordance with the invention is critical. Above 2.0 milliliters of sulfuric or phosphoric acid per 1000 grams of rosin product, the softening point drops and the advantages gained by use of the specified amounts of acid are thereby lost. Further, the color of the preferred tall oil rosin product tends to darken. At less than 0.5 milliliter per 1000 grams of rosin product of phosphoric acid the desired increase in softening point is not achieved.

By studying the changes in the tall oil rosin during treatment of tall oil rosin and maleic ester with phosphoric acid in accordance with the invention, it has been determined from infra-red and chromatographic analysis that rosin acid lactone disappears as a result of the treatment with phosphoric acid; the total lactone content of tall oil rosin is only about 4% of the total composition. Whether this is the only factor in achieving higher softening points is doubted and there is the possibility that additional reactions, not at present understood, take place in order to bring about the higher softening point of the preferred tall oil rosin product of the invention.

Using glycerol as the polyhydric alcohol it is necessary that at least 7 parts of maleic ester be reacted per 100 parts of rosin in order that a significant and practical increase in softening point takes place as a result of dienophile adduct modification by Diels-Alder mechanism. With less than 7 parts of maleic ester per 100 parts of tall oil rosin, product softening at about 240° F. are obtained, a temperature much too low for producing a practical rosin ester product. At 9 parts the softening point of the modified tall oil rosin ester product is increased sharply to about 275–280° F. and at 12 parts the softening point of the tall oil rosin ester product is between 295–300° F. Above 15 parts gelation prevents utilization of the products which become non-homogeneous. Maleic modified tall oil rosin ester products having a softening point of 305° F. have been obtained.

In the following examples parts are parts by weight unless stated otherwise:

EXAMPLE I

Eighty-two parts of tall oil rosin, having an acid number of 170, specifically Unitol ROS tall oil rosin from Union Bag-Camp Paper Corporation, were added to a previously prepared glyceryl maleate and the mixture heated to melt the rosin. The characteristics of Unitol ROS tall oil rosin are as follows:

| | |
|---|---|
| Fatty acids | 2.3%. |
| Unsaponifiables | 2.2%. |
| Acid No. | 170.0. |
| Softening point (ball and ring) | 187° F. |
| Color (French Resin Standards) | 2A to 3A. |
| Color (United States Official Rosin Standard) | Lighter than X. |

At this time, 0.05 ml. of 85% syrupy phosphoric acid for each 100 grams of the rosin-glyceryl maleate ester were added, the temperature raised to 450° F., and this temperature maintained for 2 hours. The temperature was then increased to 520° F. over a period of 1 hour and held at 520° F. until an acid number of less than 20 was obtained. The acid number of 15–20 was obtained after about 1.5 hours at 520° F. The product was cooled.

The glyceryl maleate was prepared by reacting 9 parts of maleic anhydride and 16 parts of 95% U.S.P. grade glycerol (15% excess) at 270° F. for about 2 hours.

The maleic-modified tall oil rosin glycerol ester had a softening point of 290° F. by the ball and ring method. The product contains 11 parts of maleic modifier per 100 parts of rosin.

EXAMPLE II

The procedure of Example I was repeated for modification of gum rosin WW grade and wood rosin WW grade to prepare the maleic ester modified rosin esters in the same proportions as for tall oil rosin esters with the softening points as indicated in Table I hereinabove.

EXAMPLE III

The procedure of Example I was repeated for modification of Unitol ROS tall oil rosin of the composition and grade as used in Example I except that glyceryl fumarate was used instead of glyceryl maleate. The softening point (ball and ring) of the product containing 11 parts of fumaric acid per 100 parts of rosin was 280° F. A control run was carried out which altered the procedure by reacting fumaric acid with the same tall oil rosin first to form the adduct and then esterifying the adduct with glycerol in the presence of 0.5 ml. of 85% phosphoric acid per 1000 grams of rosin product and the softening point (ball and ring) of the control product was 277° F.

EXAMPLE IV

A large batch of glyceryl maleate was prepared using proportions of 9 parts by weight of maleic anhydride to 16 parts by weight of U.S.P. glycerol, esterified at 270° F. as in Example I. This large batch was stored in a separate container.

The same proportions of tall oil rosin and glyceryl maleate as in Example I were mixed together by first melting the rosin at 450° F., then adding phosphoric acid as in Example I and then adding the stoichiometric amount of glyceryl maleate corresponding to 11 parts of maleic anhydride per 100 parts of rosin.

A control run was made to form the tall oil rosin adduct first before esterification for the formation of the adduct. Cooking was carried out at 450° F. until a negative test for maleic content was observed by the dimethyl aniline spot test. Free maleic anhydride or ester in a drop of the sample dissolved in toluene in a spot plate produces a reddish-brown coloration by reacting with dimethyl aniline test reagent. As soon as the test reagent shows no color with the rosin-maleic ester solution, the cooking of the adduct is completed. This usually requires about ½ to ¾ of an hour at 450° F., then the temperature is dropped to 350° F., glycerol added and the temperature increased to 520° F. until the rosin ester product has an acid number of between 15 and 20.

This same procedure of adduct formation and esterification was followed in preparing control samples shown in Table I for the products from gum rosin and wood rosin, the differences in the two control conventional processes shown therein being limited to the omission of the inorganic acid or the use of the inorganic acid in the process after the rosin is melted and the maleic ingredient, e.g., maleic anhydride, has been added.

EXAMPLE V

The procedure of Example I was followed except that instead of using 0.05 ml. of 85% phosphoric acid 0.1 ml. of 95% sulfuric acid was employed and a maleic-modified tall oil rosin ester product of softening point 288° F. was obtained.

By following the teachings in the foregoing illustrative examples, other polyhydric alcohols may be used, e.g., pentaerythritol to make pentaerythrityl maleate for example. The glyceryl ester may be mixed with the pentaerythrityl ester to provide a combination of softening characteristics from both of these polyhydric alcohols in reaction with the selected rosin.

Having thus disclosed the invention, what is claimed is:

1. A method for preparing polyhydric alcohol esters of maleic Diels-Alder adducts of tall oil rosin comprising esterifying from about 1.5 to 2.6 mols of a polyhydric alcohol per mol of a butenedioic compound selected from the group consisting of maleic anhydride and maleic acid to form the corresponding butenedioic ester, said polyhydric alcohol selected from the group consisting of glycerol, pentaerythritol, trimethylolethane, trimethylol propane, trimethylol butane, dipentaerythritol and mixtures of these, reacting said butenedioic ester with said tall oil rosin in an amount of ester containing from about three parts to about fifteen parts of butenedioic component expressed as maleic anhydride per 100 parts of rosin, in the presence of inorganic acid selected from the group consisting of phosphoric acid and sulfuric acid to form the rosin adduct, the amount of said acid being from about 0.5 to 2.0 milliliters of acid per 1000 grams of final ester product, said ester and said tall oil rosin being reacted at a temperature of about 425 to 550° F. for a period of time to form a rosin adduct having an acid number of less than 20.

2. A method as claimed in claim 1 wherein said acid is phosphoric acid and said reaction is carried out for a period of time to drop the acid number of the adduct to about 15–20.

3. A method as claimed in claim 1 wherein said butenedioic ester is formed from glycerol and maleic anhydride.

4. A method as claimed in claim 1 wherein said butenedioic ester is formed from pentaerythritol and maleic anhydride.

5. The product made by the method of claim 1.

References Cited in the file of this patent
UNITED STATES PATENTS

| | | |
|---|---|---|
| 2,063,542 | Ellis | Dec. 8, 1936 |
| 2,322,197 | Oswald | June 15, 1943 |
| 2,776,277 | Keim | Jan. 1, 1959 |

OTHER REFERENCES

Halbrook et al.: "Industrial and Engineering Chemistry," vol. 50, pages 321–322 (March 1958).

Conant: "The Chemistry of Organic Compounds," page 308 (4th Edition, 1952).